United States Patent [19]
Laing

[11] 3,934,643
[45] Jan. 27, 1976

[54] CONTROLLABLE HEAT PIPE

[76] Inventor: Nikolaus Laing, Hofener Weg 35-37, 7141 Aldingen bei Stuttgart, Germany

[22] Filed: Feb. 19, 1974

[21] Appl. No.: 443,257

Related U.S. Application Data

[63] Continuation-in-part of Ser. Nos. 265,644, June 23, 1972, abandoned, and Ser. No. 289,675, Sept. 15, 1972, abandoned.

[30] Foreign Application Priority Data
July 26, 1971 Austria .............................. 6455/71
Sept. 17, 1971 Austria ............................ 8082/71

[52] U.S. Cl. .................. 165/32; 165/105; 122/366
[51] Int. Cl. ............................................ F28d 15/00
[58] Field of Search ....................... 165/32, 96, 105

[56] References Cited
UNITED STATES PATENTS

| | | | |
|---|---|---|---|
| 3,499,294 | 3/1970 | Barton et al. | 62/3 |
| 3,621,906 | 11/1971 | Leffert | 165/105 X |
| 3,818,980 | 6/1974 | Moore Jr. | 165/105 X |

*Primary Examiner*—Albert W. Davis, Jr.
*Attorney, Agent, or Firm*—Pennie & Edmonds

[57] ABSTRACT

A heat pipe comprising a hermetically sealed hollow body which is filled with a saturated vapor of and a small amount of the condensate of a heat carrying fluid. The heat pipe communicates with the inside of an auxiliary body which also may contain a small amount of the condensate and vapor and which has associated therewith heat sink and heat source means by which the amount of vapor in the auxiliary body and in the hollow body may be regulated to control heat flow in the heat pipe.

10 Claims, 4 Drawing Figures

CONTROLLABLE HEAT PIPE

CROSS-REFERENCE TO OTHER APPLICATIONS

This application is a Continuation-in-Part of my co-pending application Ser. No. 265,644 filed June 23, 1972, now abandoned and application Ser. No. 289,675 filed Sept. 15, 1972, now abandoned.

THE PRIOR ART

Heat conductivity of a heat pipe is determined substantially by the mass flow of a circulating condensate of a heat carrying fluid contained within the pipe such that a heat pipe has a constant apparent thermal conductivity co-efficient.

Controllable heat pipes are known in which bulges or collection bodies are provided in the heat discharge region of the pipe where the bulges may collect condensate which then can be returned to circulation within the pipe by a change in position of the pipe or by utilizing means for moving the bulge or collection body so that it will discharge the condensate collected therein. A difficulty of this method of control of heat conductivity of a heat pipe is that it requires mechanically or magnetically moveable parts. A further difficulty is that the size of the condensate container determines the amount of condensate which can be released into the heat pipe, and then only the total amount of condensate contained in the bulge or container can be returned to circulation within the pipe which amount cannot be metered. Thus there can be no fine degree of control of heat transfer in such systems. An example of this type prior art is disclosed in German OS No. 1,943,122.

THE OBJECT OF THE INVENTION

It is an object of the present invention to provide means for controlling the heat flow of a heat pipe to a fine degree of accuracy in which the apparent thermal conductivity co-efficient of the heat pipe can be selected within a large range, for example, within the range from 1 to 1,000.

A further object is to provide means whereby the heat transmission through hollow panel sections may be controlled where the panels may comprise a part of a wall structure used in the climatic control heating of a building and where the wall structure is exposed to absorption radiation of solar energy. It is advantageous that the transfer of heat in such panels be controlled in opposite senses of direction with respect to the cross-section of the panel and to a fine degree of control to the extent of even, in some instances, of allowing transfer of heat in one direction only.

GENERAL DESCRIPTION OF THE INVENTION

Broadly, the invention comprises having a heat pipe in the form of a hollow panel where the inside of the heat pipe is connected to an auxiliary hollow body and where the auxiliary hollow body has a temperature control means for controlling temperature in the auxiliary body within a range larger than the operational temperature range of the heat pipe. If the temperature of the auxiliary body is lowered by means of a heat sink below the lowest operating temperature of the heat pipe, substantially the entire heat carrier fluid within the heat pipe will condense within the auxiliary hollow body whereby the heat conductivity of the heat pipe drops to the level of the conductivity of the pipe itself which conventionally is made of metal. If full heat conductivity of the heat pipe is desired, the auxiliary hollow body is heated to a temperature above the mean temperature of the heat pipe by means of a heat source. If only partial heat transfer of the heat pipe is desired, the auxiliary body is only partially heated such that only part of the heat carrier fluid is vaporized and enters into the heat pipe. The maximum apparent thermal conductivity co-efficient of the heat pipe is thus reduced but nevertheless heat is transferred via the evaporation enthalpy of the heat carrier fluid such that the apparent thermal conductivity co-efficient of the heat pipe exceeds that which corresponds to the thermal conductivity of the pipe material itself.

The heat carrier fluid is contained inside the heat pipe in both the liquid and in the saturated vapor phase. As the internal pressure within the heat pipe depends exclusively upon the temperature at the coldest spot within the pipe, the invention contemplates use of heat carriers, the vapor pressure of which (having regard to the expected operating temperatures) never exceeds atmospheric pressure. The boiling point of such a heat carrier is defined at the temperature at which the condensate transforms into the vapor phase at the pressure of 1 bar, i.e. atmospheric pressure. The invention preferably utilizes fluid heat carriers the boiling point of which is below the lowest operating temperature prevailing inside the heat pipe where the pressure inside the heat pipe is always below atmospheric pressure. The auxiliary body preferably has associated therewith heat source and heat sink means whereby the temperature of the body may be regulated. The heat sink and heat source may take the form of a Peltier element. Other heat source means such as circulating carriers or electrical heaters may be used and other heat sink means such as circulating heat carriers or evaporator surfaces may also be used.

The auxiliary body may also be provided with a plurality of spaces within the body containing condensate whereby condensate in the spaces will be subjected to varying temperatures depending upon their spacing with respect to the heat sink associated with the auxiliary body.

DETAILED DESCRIPTION OF THE PREFERRED EMBODIMENTS

Figure 1:
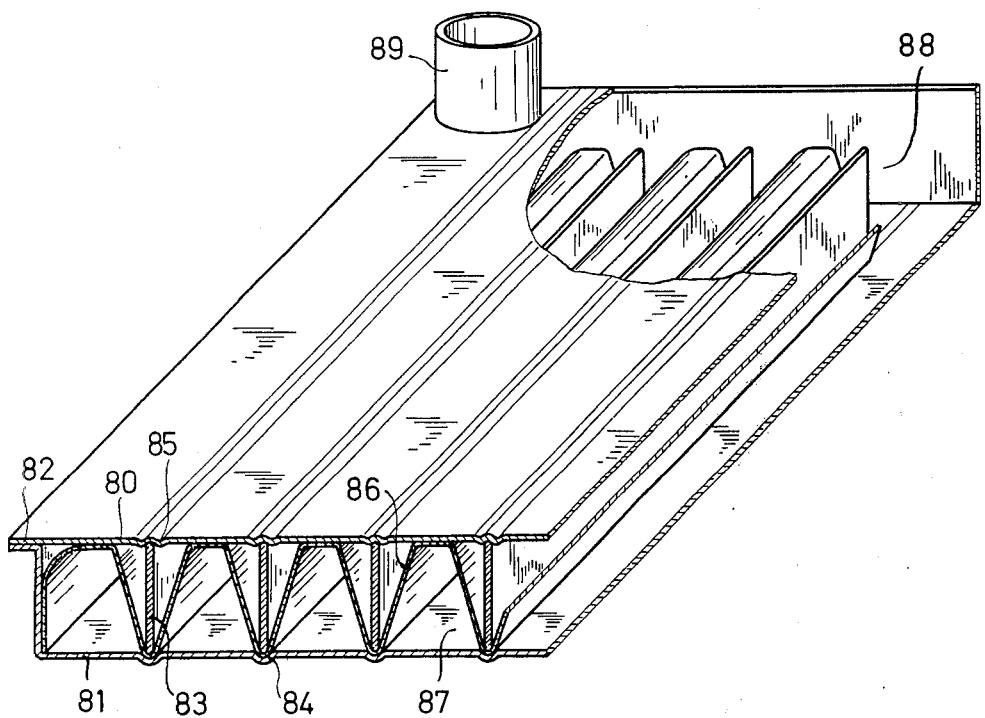
FIG. 1 is a perspective and partially sectioned heat pipe comprising a heat rectifier panel constructed in accordance with the invention.

Referring to FIG. 1, there is illustrated a cross-section of a heat pipe constructed according to the invention in the form of a panel adaptable for use in the walls of a building structure. The panel comprises a hollow body comprising two sheet metal main walls 80 and 81 which are joined to each other along the seam 82. The walls 80 and 81 are supported with respect to each other by means of spacer webs 83 comprising a material having a low co-efficient of thermal conductivity. The webs 83 are held parallel and perpendicular to the walls by means of grooves 84 and projections 85. A corrugated absorbent lamina 86 is contained within the hollow body and contacts walls 80 and 81 and serves to convey condensate of a heat carrier fluid from one of the walls to the other wall by capillary action. The spacer webs 83 divide the panel into sections 87 which are inner-connected along one end of the panel by a channel 88 extending at right angles to the webs. Channel 88 in turn is connected to an auxiliary chamber (not shown) via the conduit 89.

In the event that the panel is to be used as a heat rectifier panel which will transfer heat only in one direction, the lamina 86 may be dispensed with whereby heat may be transferred only from the bottom region of the panel to the top region, i.e. from wall 81 to wall 80. When the lamina is employed, it serves to convey condensate from the bottom wall 81 up to the wall 80 which makes downward heat transfer possible when a heat source is applied to the wall 80 and where heat is to be transferred to the wall 81.

Figure 2:
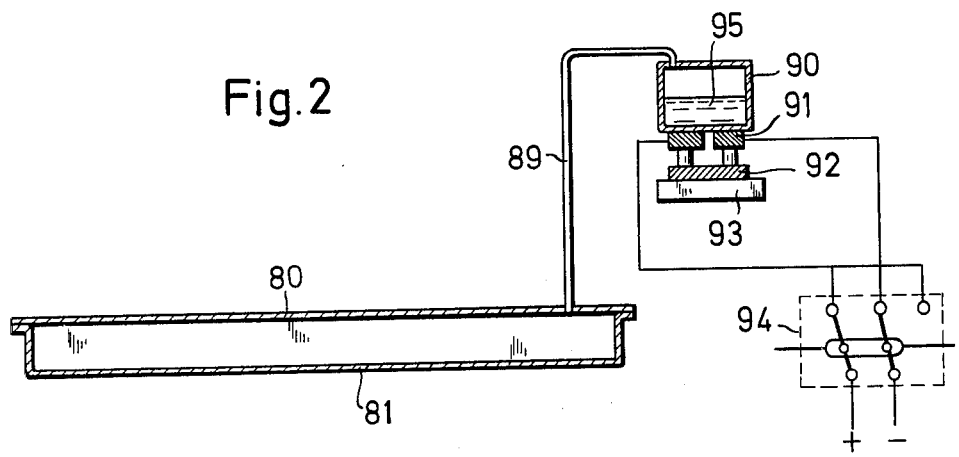
FIG. 2 illustrates diagrammatical means for controlling heat transmission through the panel of FIG. 1.

Referring to FIG. 2, the panel comprising the main walls 80 and 81 is shown connected by a conduit 89 to an auxiliary body comprising a condensor 90. The temperature of the auxiliary body may be regulated by a Peltier element of which one set of electrodes 91 is in good thermal contact with the auxiliary body while the other set of electrodes is in good thermal contact with cooling fins 93. The direction of flow of a direct current is selected by means of a change-over switch 94. When the electrodes 91 are connected as a heat sink, the heat carrier fluid contained within the hollow body, conduit 89 and auxiliary body 90 will condense into a condensate 95. Heat conductivity between the walls 80 and 81 will then be reduced substantially to the value determined by the heat conductivity of the webs 83 and vertical end portions of the wall 81 connecting with the wall 80 with a very small amount of conductivity being due to any residual vapor that remains in the panel cavity. By switching the change-over switch 94, any desired quantity or even the whole quantity of the condensate 95 can be evporated back into the auxiliary body 90, conduits 95 and hollow body so that any intermediate value of heat transfer between the walls 80 and 81 can be achieved.

Figure 3:
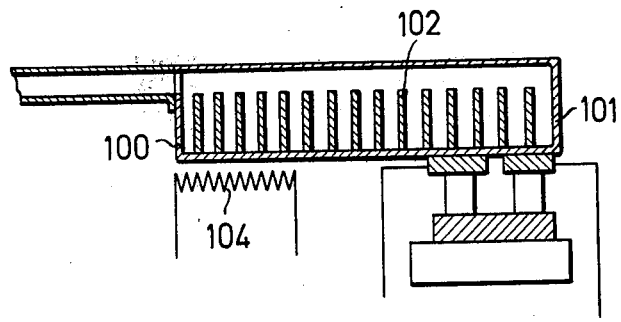
FIG. 3 illustrates a further embodiment of the control means according to FIG. 2.

FIG. 3 illustrates a modified form of auxiliary body in which the condensate quantities and thereby the heat transfer of the panels are controlled by setting up a temperature gradiant between the regions 100 and 101 of the auxiliary body. Condensate is collected in a plurality of individual secondary containers 102. A Peltier element 103 acting as a heat sink may cool one end of the auxiliary body while the other end of the body may be heated by an electrical heating source 104 acting as a heat source. The more that the heat source 104 heats, the more that the condensate within the containers 102 vaporize. This embodiment is particularly suitable with proportional control thermostats which sense, for example, ambient temperatures to be used for the purposes of controlling the heat transfer between the walls 80 and 81. The devices according to FIGS. 2 and 3 can also be used to control heat flow between heat storage substances and the ceilings or walls of a room.

Figure 4:
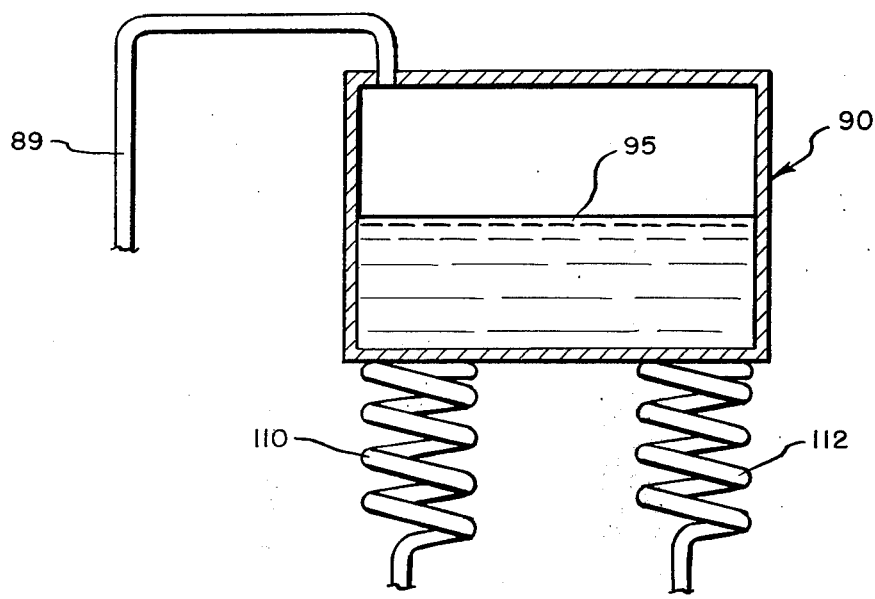
FIG. 4 illustrates a still further embodiment of control means according to FIG. 2.

FIG. 4 illustrates a still further embodiment wherein the heat source for the auxiliary body may comprise a heat carrier which is circulated through coils 110 and which is in thermal contact with the auxiliary body. The heat sink as shown in FIG. 4 may also comprise a heat carrier which is circulated through the coils 112 and which is in thermal contact with the auxiliary body 90.

The coils 112 rather than being part of a circulation system could also comprise part of an evaporation cooler in good thermal contact with the auxiliary body 90 to act as a heat sink. It is obvious that the coils 110 and 112 could be also substituted by the electrical heating and Peltier elements of FIG. 3 to provide the heat source and heat sink means by which the control of the heat transfer properties of the panel is achieved.

Preferably as shown in FIG. 2 the conduit connecting the auxiliary body 90 with the panel enters the auxiliary body from the top. This construction assures that no condensate will be passed into the panel but only saturated vapor. This further assures accurate control of heat transfer between the walls 80 and 81.

Preferably the spacer webs 83 contained in the panel comprise good thermal insulators. Organic materials are particularly suitable as a material for the webs, such as reinforced paper, phenolic resin or hard synthetic resins, examples of which are acetate or polycarbonate resins. Ceramic materials may also be used. In order to reduce heat flow through the webs 83, the supporting area between the web and at least one of the walls 80 or 81 is preferably of a small cross-sectional area, such as a knife edge.

The heat carrier fluid used may comprise fluoride hydrocarbons which are preferable because of the comparitively heavy weight of their vapor. The heavier the vapor, the lower is its co-efficient of heat transfer. Thus, when the panels are to act as heat insulating panels, it is desirable that a heavy vapor be used. Heat transmission in the panel can be still further controlled by filling the inside of the panel with glass fiber roving or felt-type materials to reduce or prevent convection currents of the vapor within the panel.

I claim:

1. A controllable heat pipe formed as a main hollow body having therein a saturated vapor of and a boiling condensate of a liquid and an auxiliary hollow body in gaseous communication with the main hollow body and into which said vapor and condensate may be controllably maintained, a heat sink device in heat conducting contact with said auxiliary body for withdrawing heat from the auxiliary hollow body and a heat source for said auxiliary body for supplying heat thereto; the improvement comprising in that said auxiliary body includes therein a plurality of separate spaces containing said vapor and condensate and in that said heat sink device is positioned near one end of said auxiliary hollow body whereby the spaces within said hollow body progressively nearer to said heat sink device will be exposed to lower temperatures than said spaces progressively further away from said heat sink device.

2. A controllable heat pipe according to claim 1 the improvement further comprising in having in addition a heat source device positioned near an end of said auxiliary hollow body opposite said heat sink device whereby the spaces within said hollow body progressively nearer to said heat source device will be exposed to higher temperatures than said spaces progressively further away from said heat source device.

3. A controllable heat pipe according to claim 2 wherein said heat source device comprises an electrical heater.

4. A controllable heat pipe according to claim 2 wherein said heat sink device forms part of a Peltier element.

5. A controllable heat pipe according to claim 2 wherein said heat sink device forms part of a circulation system of a fluid heat carrier.

6. A controllable heat pipe according to claim 2 wherein said heat sink device forms part of an evaporator.

7. A controllable heat pipe according to claim 2 where said heat sink device forms part of a Peltier element and includes in addition a change-over switch associated with said Peltier element whereby the heat sink device may be changed to a heat source device.

8. In a hollow panel having main walls and controllable heat transmission means for controlling transmission of heat between said main walls, characterized in that said controllable heat transmission means comprises a main condensate container in fluid communication with the interior of said hollow panel, a heat carrier fluid in said main condensate container, a plurality of individual secondary condensate containers in said main condensate container arranged in a line for containing condensate of said heat carrier fluid and which are in gaseous communication with each other, a heat source at one end of said line for heating condensate in the individual secondary containers to vaporize the same, and a heat sink on the other end of said line for cooling vapor of said heat carrier fluid whereby the amount of vapor of said heat carrier fluid in said hollow panel may be varied to control heat transmission between the main walls of said panel.

9. In a hollow panel according to claim 8, further characterized in having a thermostat means for controlling the operation of said heat source.

10. In a hollow panel according to claim 8, further characterized in having thermostat means for controlling operation of said heat sink.

* * * * *